United States Patent [19]

Oshima et al.

[11] Patent Number: 4,487,338

[45] Date of Patent: Dec. 11, 1984

[54] DISTRIBUTION FEEDER

[75] Inventors: Yasushi Oshima; Michinobu Omae, both of Akashi, Japan

[73] Assignee: Yamato Scale Company, Ltd., Akashi, Japan

[21] Appl. No.: 431,801

[22] Filed: Sep. 30, 1982

Related U.S. Application Data

[63] Continuation-in-part of Ser. No. 192,417, Sep. 29, 1980, abandoned.

[30] Foreign Application Priority Data

Dec. 5, 1979 [JP] Japan ............................... 54-169112

[51] Int. Cl.³ ............................................. B67D 5/06
[52] U.S. Cl. ................................... 222/196; 222/200; 222/482
[58] Field of Search ............... 222/196, 199, 200, 478, 222/481, 482; 198/391, 392, 756, 757; 239/223, 224

[56] References Cited

U.S. PATENT DOCUMENTS

| 3,133,627 | 5/1964 | Lenders et al. | 198/757 X |
| 3,300,098 | 1/1967 | Quester et al. | 222/200 X |
| 3,939,928 | 2/1976 | Murakami et al. | 177/25 |
| 4,181,216 | 1/1980 | Cipu | 198/757 |
| 4,308,928 | 1/1982 | Oshima | 177/25 |

FOREIGN PATENT DOCUMENTS 1370066 6/1964 France ................................ 198/757

Primary Examiner—Joseph J. Rolla
Assistant Examiner—Michael S. Huppert
Attorney, Agent, or Firm—Eugene E. Geoffrey, Jr.

[57] ABSTRACT

An improved distribution feeder of circular disc type, for receiving articles at the central portion and exhausting them from a plurality of outlets at the periphery, having the upper surface provided with a slope highest at the center and slanting down toward the periphery and a vibrator for imparting vertical and rotational vibration to the distribution feeder, thereby facilitating free movement of the articles to eliminate undesirable accumulation of the articles at the closed outlets.

2 Claims, 3 Drawing Figures

U.S. Patent    Dec. 11, 1984    4,487,338
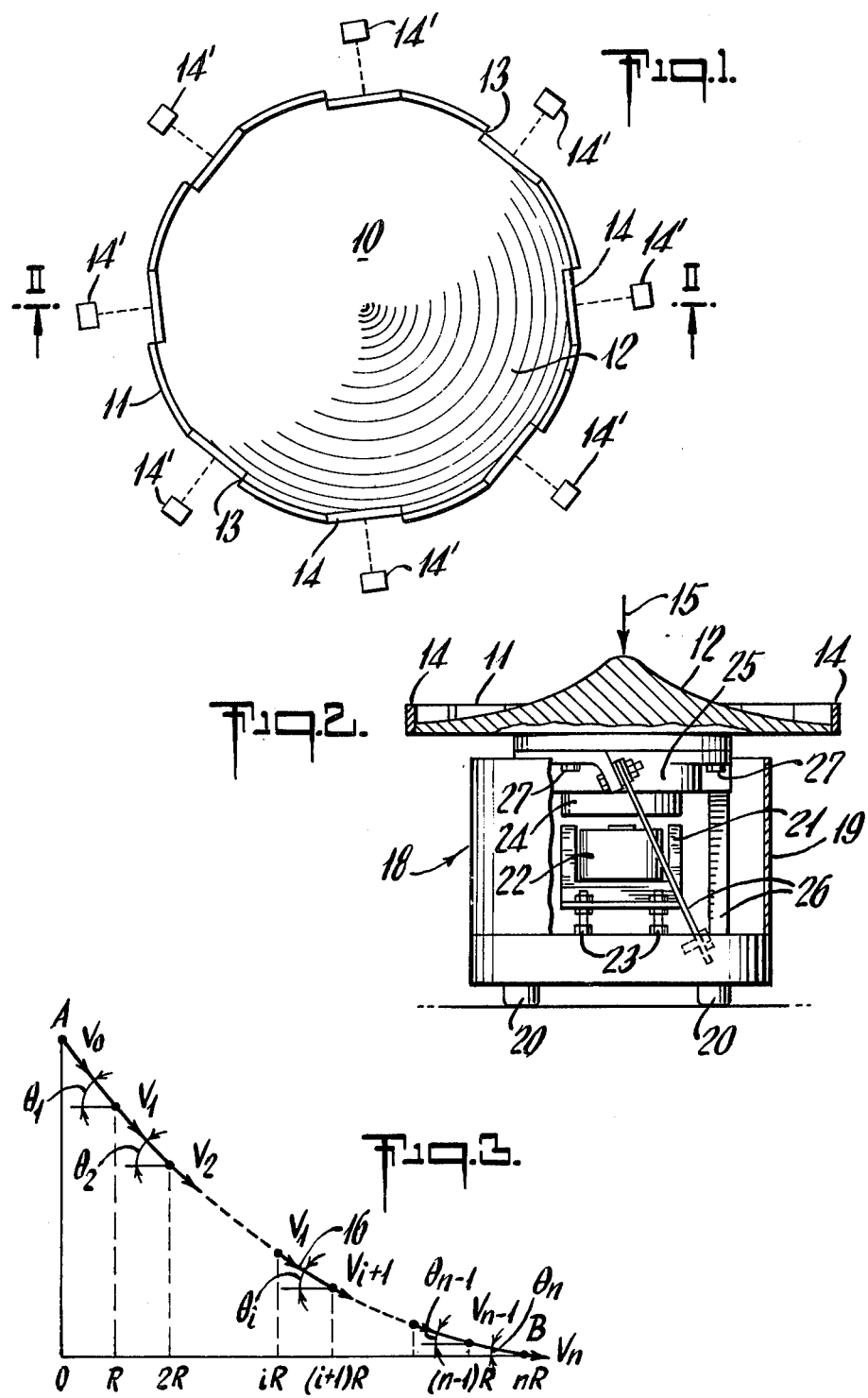

DISTRIBUTION FEEDER

This application is a continuation-in-part of Application Ser. No. 192,417, filed Sept. 29, 1980, now abandoned entitled: "Distribution Feeder".

This invention relates to a distribution feeder which is especially useful when applied to a combination weighing machine.

A combination weighing machine is a device for weighing articles of the same kind but different weights by a plurality of weighing balances at the same time and collecting the articles on those weighing balances whose total weight is nearest a predetermined value to transfer them to the next step such as packing, as disclosed in Japanese Patent Publication No. 54-14946 and U.S. Pat. No. 3,939,928, for example. While various means have been proposed for distributing the articles automatically to the respective weighing balances of the combination weighing machine, the distribution feeder is an example of them.

In prior art distribution feeders, a plurality of spiral grooves or guide walls are provided on a substantially flat surface of a circular disc from the center toward the periphery and the disc is subjected to a rotational vibration in the circumferential direction. As the articles supplied to the central portion of the disc surface are successively moved toward the periphery along the spiral guides by the rotational vibration, the spiral guides are respectively provided with receptors at the respective peripheral ends, which are coupled to the respective weighing balances, so that the articles are distributed automatically to the weighing balance. At the peripheral ends of the spiral guides, shutters are provided, respectively, for interrupting exhaust of the articles during the weighing operation of the weighing balances.

As described above, in the combination weighing machine, the weighing balances carrying the articles with an acceptable total weight exhaust these articles and then receive new ones, but the articles on the other weighing balances are left as they are. Therefore, the shutters of the feeder corresponding to these remaining balances are left as closed. This results in accumulation of the articles at the exit ends of the spiral guides and, in case of prolonged accumulation, especially, when the articles are foods, may result in undesirable change in quality. This problem also takes place when some of the weighing balances are repaired as operation of the combination weighing machine is most severe when the number of weighing balances is less than the number of exits of the feeder and, therefore, some of the shutters are always closed.

In order to remove this problem, the invention of the Japanese Patent Publication No. 52-12426 makes the peripheral portion of the feeder higher than the central portion and also provides a door in each guide wall in the vicinity of the periphery, to allow discharge of the articles to the adjoining path and also return the excess articles toward the central region by reason of the inward slope, by opening the door when the corresponding shutter is closed. Although this structure can reduce accumulation of the articles to some extent, it has the disadvantage that the structure is complicated and expensive and can easily get out of order.

This invention provides a novel and improved distribution feeder from which the abovementioned disadvantages of the prior art have been completely removed.

According to this invention, the distribution feeder includes a circular base having a plurality of exits at the periphery, and driving means for imparting both rotational and vertical vibration to the circular base. The upper surfce of the base is provided with a radial slope which is raised at the central portion and slants downwardly toward the periphery, and the slanting angle of the slope is gradually reduced from the center to the periphery.

The invention will be described in more detail hereinunder with reference to the accompanying drawings.

IN THE DRAWINGS

FIG. 1 is a plan view representing an embodiment of the distribution feeder according to this invention;

FIG. 2 is a crosssectional view taken along the line 2—2 of FIG. 1 with the vibrating means in partial section; and FIG. 3 is a graph representing the inventive slope of the distribution feeder, shown in exaggerated scale, as an aid in understanding mathematical analysis of this invention.

Referring to FIGS. 1 and 2, the distribution feeder of this invention includes a base or body 10 of a generally circular disc type having a peripheral wall 11. The upper surface 12 of the base 10 is raised at the center and smoothly slants downwardly radially toward the periphery. The peripheral wall 11 has eight cut-aways or slots 13 which face respectively the weighing hoppers of a combination weighing machine (not shown) and serve as the exits of the distribution feeder. Each exit slot 13 has a shutter 14 which is driven selectively by the shutter driver 14' of a combination weighing machine to control the supply of articles to each weighing hopper (not shown). The distribution feeder also includes a vibrator 18 for imparting rotational and vertical vibration to the base 10 to cause circular movement of the articles on the base 10. As shutter drivers are well known in this field, they are shown only in block form and will not be described further.

The form of vibrator 18 illustrated in partial section in FIG. 2 includes an outer housing 19 having vibration absorbing supports 20. An electromagnet having an E-shaped magnetic core 21 with a coil 22 surrounding one leg of the core 21 is secured to the housing 19 by bolts 23. Armature 24 is carried by a supporting structure 25, the latter being supported by leaf springs 26 to maintain the armature 24 in spaced relationship to the core 21 of the electromagnet. In the instant embodiment, four inclined leaf springs 26 are utilized and spaced at 90° intervals. Each spring is secured at the top to the supporting structure 25 and at the bottom to the base of the housing 19. With this arrangement and upon energization of the coil 22 with either an alternating or interrupted current, the armature 24 will be periodically drawn to the electromagnet 21, 22 and in so doing, the structure will be simultaneously vibrated vertically and rotationally. Since the distribution feeder 10 is secured to the supporting structure 25 by means of bolts 27, rotational and vertical vibration will be imparted thereto.

When the articles are supplied to the central peak of the upper surface 12 of the base 10 as shown by arrow 15, they will slide down the slope by gravity and also move tangentially by the rotational and vertical vibration of the base 10, thereby tracing spiral paths toward the periphery. When the articles reach the periphery, they will move circumferentially along the peripheral wall 11 and be discharged from the exits 13 having the shutters 14 opened. Thus, no accumulation of the articles will take place since there is no obstacle such as a guide wall, as in the prior art feeder, on the surface 12 of the base 10.

Now, the contour of the slope will be mathematically analyzed with reference to FIG. 3. Divide the slope AB of the feeder base 10 having radius nR equally into n along the radial direction, and assume that the slope surface of the respective segments are all conical. Assume further that the articles are fed from just above the apex A (15) of the slope with an initial speed $V_0$ along the generators of the conical surface and slide down the slope with a frictional coefficient $\mu$. Express the speeds of articles along the generators at respective points corresponding to radii R, 2R, ... iR, ... nR with $V_1$, $V_2$, ... $V_i$, ... $V_n$, respectively, and the angles of inclination of the generators at these points with respect to the horizontal plane with $\theta_1, \theta_2, \ldots \theta_i, \ldots \theta_n$, respectively. Since the acceleration of a body sliding down a slope of angle of inclination $\theta$ with frictional coefficient $\mu$ is $g(\sin\theta - \mu\cos\theta)$, as well known in the art, where g is the acceleration of gravity, the following equation can be established for the equi-acceleration linear motion on an arbitrary segment slope 16 between the radii R and (i+1) R, as well known in this field.

$$V_{i+1}^2 - V_i^2 = 2g(\sin\theta_i - \mu\cos\theta_i)R/\cos\theta_i \quad (1)$$

Equation (1) can be redrafted as follows:

$$\theta_i = \tan^{-1}\left(\frac{V_{i+1}^2 - V_i^2}{2gR} + \mu\right) \quad (2)$$

In order to enable the articles fed to the apex A at a flow rate (volume per unit time) Q to slide down the slope AB with a constant thickness T at uniform density, the flow rate across an arbitrary circle of radius iR, that is, $2\pi iRTV_i$ must be equal to Q. Accordingly, $$V_i = Q/2\pi iRT \quad (3)$$

This means that the speed must be decreased in inverse proportion to the radius. As understood from a comparison of Equations (2) and (3), the angle of inclination $\theta_i$ will rapidly decrease with increase of the radius.

In case of designing the slope practically, it is unnecessary to make the number of divisions n very large, and n=5 or, in many cases, n=3 are satisfactory. After the number n is determined, Equation (3) is used to calculate the speeds at the respective knee points and then Equation (2) is used to calculate the corresponding angles of inclination. The segment slopes are preferably connected with smooth curved surfaces. Although the assumption was made in the above theoretical analysis that the articles slide down along the generators of the conical surfaces, they slide down the slope along spiral paths in practice due to the rotational and vertical vibration of the base 10. However, this has not resulted in trouble in practice.

What is claimed is:

1. A distribution feeder for the distribution of articles substantially uniformly among a plurality of outlets and substantially preventing unduly sustained accumulation of articles at certain outlets comprising a substantially circular body having a vertically disposed central axis, a vertically disposed peripheral wall carried by said circular body and extending upwardly therefrom, said wall having a plurality of spaced outlets, means for individually operating each of said outlets, said outlets being selectively opened for the discharge of articles therefrom, the upper surface of said body being shaped such that the central portion is higher than the peripheral portion with the rate of slope decreasing with an increase in radius and means for vibrating said circular body vertically and rotationally about its center whereby the articles fed on to the central portion of said body will move downwardly in a spiral path at a speed inversely proportional to the radial position thereof and then continue to move circumferentially to effect substantially uniform distribution about the periphery of said feeder.

2. A distribution feeder according to claim 1 wherein the slope of the upper surface of the feeder is divided into at least three divisions with the slope of each successive division being decreased to produce a selected flow rate and with said divisions being joined one to the others by smooth curved surfaces.

* * * * *